(12) United States Patent
Tuchscherer

(10) Patent No.: US 9,926,064 B1
(45) Date of Patent: Mar. 27, 2018

(54) LATCHING APPARATUSES FOR COWLS ON OUTBOARD MARINE ENGINES

(71) Applicant: Brunswick Corporation, Lake Forest, IL (US)

(72) Inventor: Andrew Tuchscherer, Wauwatosa, WI (US)

(73) Assignee: Brunswick Corporation, Mettawa, IL (US)

( * ) Notice: Subject to any disclaimer, the term of this patent is extended or adjusted under 35 U.S.C. 154(b) by 398 days.

(21) Appl. No.: 14/721,106

(22) Filed: May 26, 2015

(51) Int. Cl.
| | |
|---|---|
| *B63H 20/32* | (2006.01) |
| *B63H 21/36* | (2006.01) |
| *F16B 35/04* | (2006.01) |
| *F16C 1/02* | (2006.01) |
| *F16H 1/28* | (2006.01) |

(52) U.S. Cl.
CPC ........... *B63H 21/36* (2013.01); *F16B 35/042* (2013.01); *F16C 1/02* (2013.01); *F16H 1/28* (2013.01)

(58) Field of Classification Search
CPC . F02B 61/045; B63H 20/32; B63H 2020/323; Y10T 403/591; Y10T 403/593
See application file for complete search history.

(56) References Cited

U.S. PATENT DOCUMENTS

| | | | | |
|---|---|---|---|---|
| 4,348,194 A | * | 9/1982 | Walsh | F02B 61/045 |
| | | | | 123/195 P |
| 4,948,194 A | | 8/1990 | Dogliani | |
| 5,120,248 A | * | 6/1992 | Daleiden | B63H 20/32 |
| | | | | 292/202 |
| 6,991,500 B1 | * | 1/2006 | Gulko | B63H 20/32 |
| | | | | 123/195 P |
| 7,163,428 B2 | * | 1/2007 | Sanschagrin | B63H 20/32 |
| | | | | 123/195 C |
| 7,201,623 B1 | * | 4/2007 | Krupp | B63H 20/32 |
| | | | | 440/77 |

* cited by examiner

*Primary Examiner* — Michael P Ferguson
(74) *Attorney, Agent, or Firm* — Andrus Intellectual Property Law, LLP

(57) ABSTRACT

A latching apparatus is for a cowl on an outboard marine engine. The cowl has a first cowl portion and a second cowl portion, which are latched together by the latching apparatus in a closed cowl position and unlatched from each other in an open cowl position. The latching apparatus comprises a retainer on the first cowl portion; an actuator device on the second cowl portion, and a wire coupled to the actuator device. The wire is coupled to the retainer in the closed cowl position and the wire is uncoupled from the retainer in the open cowl position. Actuation of the actuator device in a first direction rotates the wire so as to couple the wire to the retainer and actuation of the actuator device in a second direction rotates the wire so as to uncouple the wire from the retainer.

18 Claims, 9 Drawing Sheets

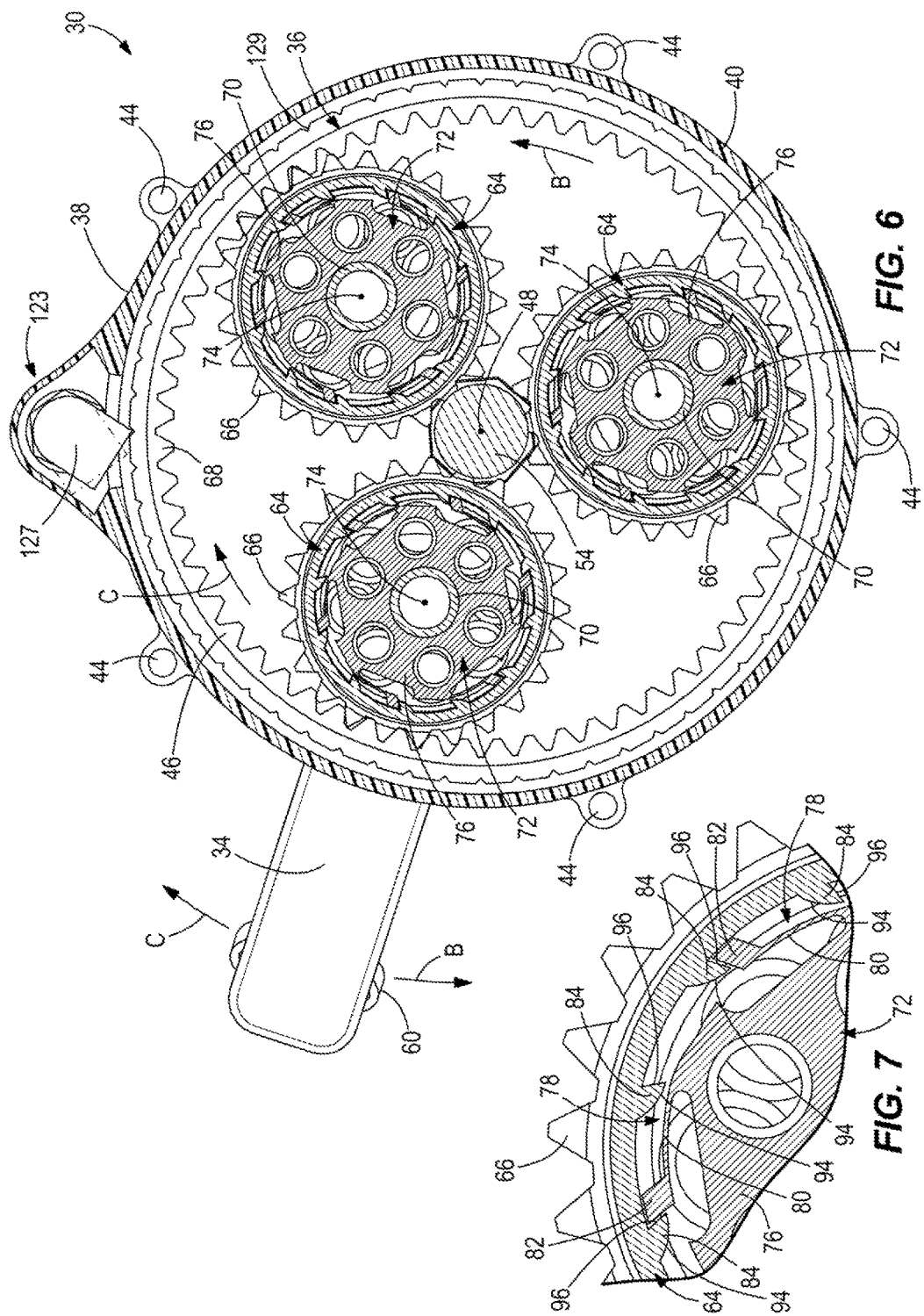

LATCHING APPARATUSES FOR COWLS ON OUTBOARD MARINE ENGINES

FIELD

The present disclosure relates to cowls on outboard marine engines, and more specifically to latching apparatuses for cowls on outboard marine engines.

BACKGROUND

U.S. Pat. No. 4,348,194 is incorporated herein by reference in entirety and discloses a cowl for the power head of an outboard motor that includes two bottom cowl members attached together by screws which also mount a latch bracket and a hinge member. The latch bracket supports a latch mechanism which, with the hinge member, serves to hold a top cowl member in place.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

A latching apparatus is for a cowl on an outboard marine engine. The cowl has a first cowl portion and a second cowl portion which are latched together by the latching apparatus in a closed cowl position and unlatched from each other in an open cowl position. The latching apparatus comprises a retainer on the first cowl portion; an actuator device on the second cowl portion; and a wire attached to the actuator device. The wire is coupled to the retainer in the closed cowl position and the wire is uncoupled from the retainer in the open cowl position. Actuation of the actuator device in a first direction rotates the wire so as to couple the wire to the retainer and actuation of the actuator device in a second direction rotates the wire so as to uncouple the wire from the retainer.

BRIEF DESCRIPTION OF THE DRAWINGS

The present disclosure is described with reference to the following Figures. The same numbers are used throughout the Figures to reference like features and like components.

FIG. 6 is a view of section 6-6 shown in FIG. 3.

FIG. 7 is a detail view of a portion of FIG. 6.

DETAILED DESCRIPTION OF THE DRAWINGS

Figure 1:
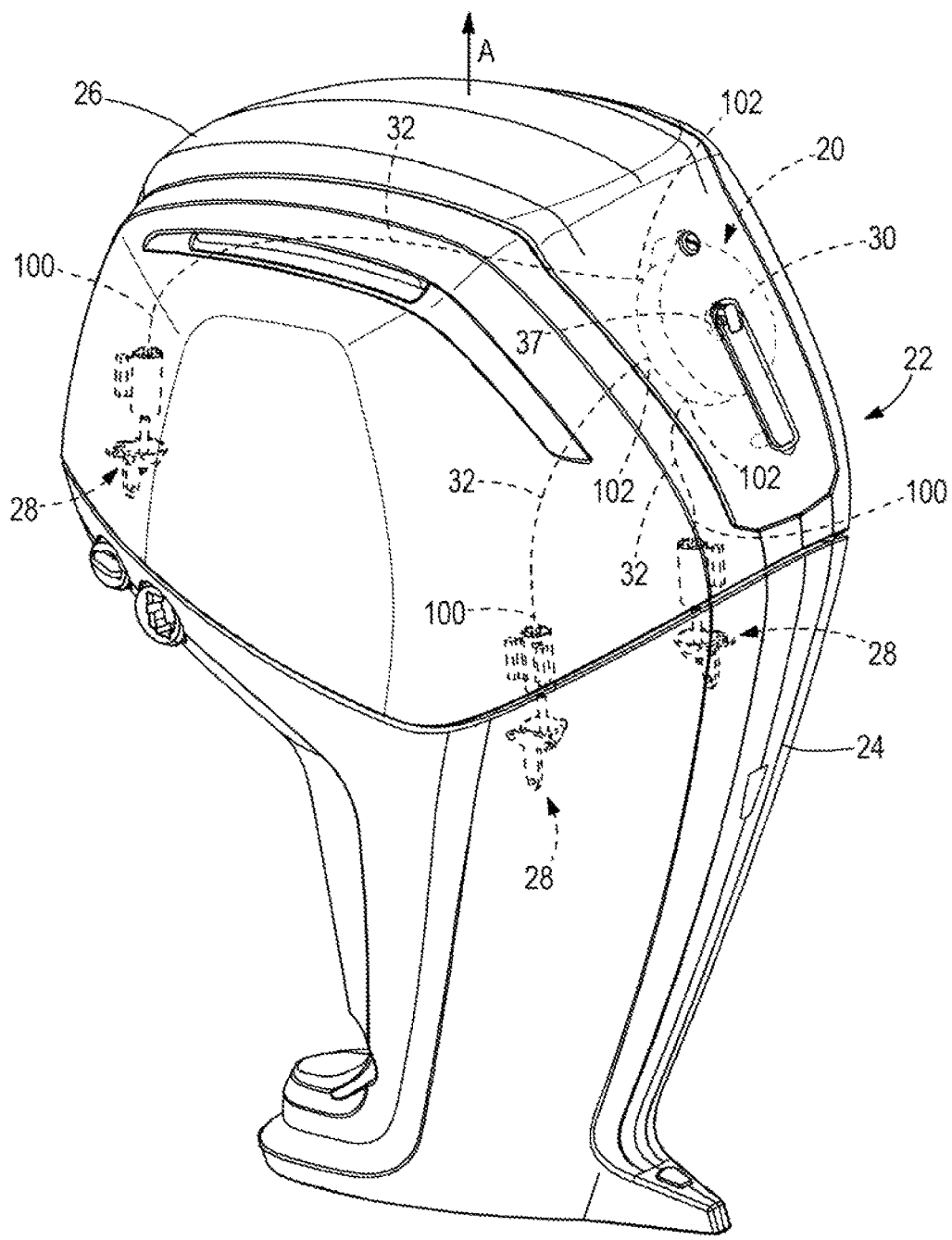
FIG. 1 is a perspective view of a cowl on an outboard marine engine, the cowl being shown in a closed cowl position.

FIG. 1 depicts a latching apparatus 20 for a cowl 22 on an outboard marine engine. The cowl 22 has a first cowl portion, which in this example is a bottom cowl 24 and a second cowl portion, which in this example is a top cowl 26. The bottom cowl 24 and top cowl 26 are shown latched together by the latching apparatus 20 in a closed cowl position. Unlatching of the latching apparatus 20 allows movement of the top cowl 26 away from the bottom cowl 24 in the direction of arrow A to an open cowl position (not shown), wherein the top cowl 26 and bottom cowl 24 are unlatched from each other. In some examples, the top cowl 26 can pivot with respect to the bottom cowl 24 during movement between the closed cowl position and the open cowl positions. In other examples, the top cowl 26 can be completely separated from the bottom cowl 24 during movement from the closed cowl position to the open cowl position. Those having ordinary skill in the art will realize that the concepts of the present disclosure are applicable to the particular cowl 22 shown in the drawings and also to other similar cowls. In other words, the cowl 22 shown in the drawings is not limiting on the concepts of the present disclosure. Those having ordinary skill in the art will also realize that the concepts of the present disclosure are applicable to arrangements wherein the first cowl portion is a top cowl and the second cowl portion is a bottom cowl, and/or arrangements wherein the first and second cowl portions are on opposite sides of the outboard marine engine, instead of on the top and bottom. Other similar and/or like variations are contemplated by the present disclosure.

As shown in FIG. 1, the latching apparatus 20 includes a plurality of retainers 28 that are attached to the bottom cowl 24, an actuator device 30 that is attached to the top cowl 26, and a plurality of wires 32 that are attached to the actuator device 30 and that extend towards the retainers 28. As described further herein below, the wires 32 are coupled to the retainers 28 in the closed cowl position shown in FIG. 1 and uncoupled from the retainers 28 in the open cowl position described herein above. As described further herein below, actuation of the actuator device 30 in a first direction rotates the wires 32 so as to couple the wires 32 to the retainers 28. Conversely, actuation of the actuator device 30 in an opposite, second direction rotates the wires 32 in an opposite direction so as to uncouple the wires 32 from the retainers 28. These and other concepts will become more apparent from the following description of the drawings.

FIGS. 2-7 depict features of the actuator device 30 in more detail. FIGS. 8-12 depict one of the retainers 28 and one of the wires 32 in more detail. Each of the retainers 28 and wires 32 are the same and therefore FIGS. 8-12 equally apply to all of these elements.

Referring now to FIGS. 1-7, each wire 32 (FIGS. 1, 3, 4) in the plurality of wires 32 is coupled to and uncoupled from a respective one of the plurality of retainers 28 (FIG. 1) by actuation of the actuator device 30. The exact configuration of the actuator device 30 can vary from that which is shown. In the illustrated example, the actuator device 30 includes a handle arm 34 and a gearset 36 that transmits actuation (here rotation) of the handle arm 34 to each respective wire 32 in the plurality of wires 32. The gearset 36 is disposed in a gearset housing 38 having a base housing 40 and a housing cover 42. The gearset housing 38 is connected to the interior of the top cowl 26 by for example removable fasteners (not shown), which are received in fastening holes 44 formed in the base housing 40 and corresponding holes formed in the top cowl 26. The handle arm 34 is located on the exterior of the top cowl 26 and is attached to the gearset 36 through a hole 37 in the top cowl 26.

Figure 2:
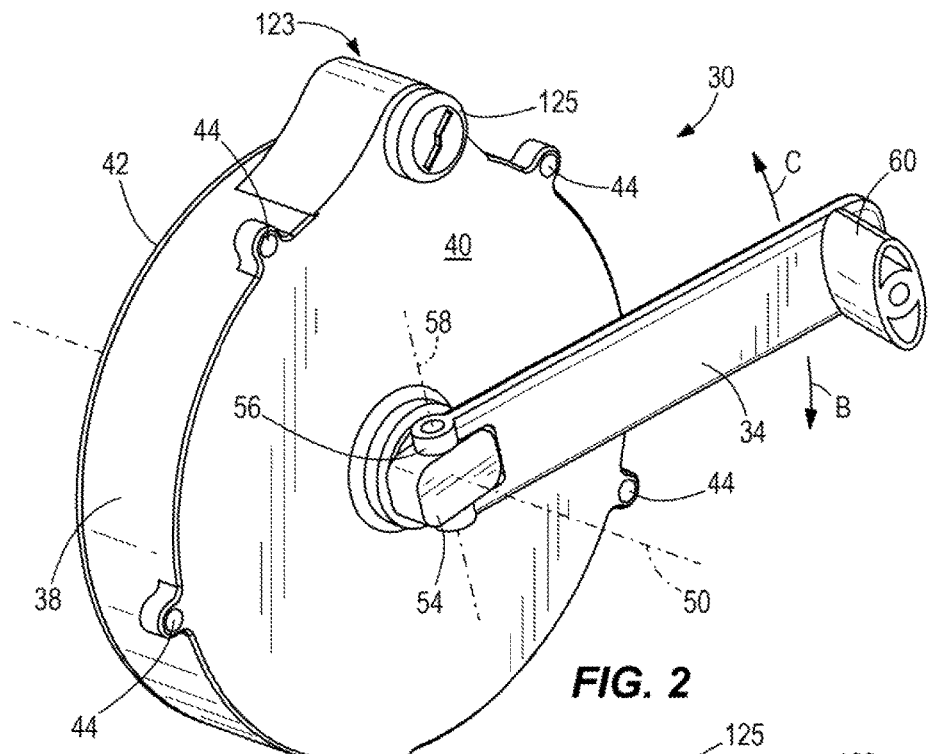
FIGS. 2 and 3 are front and rear perspective views of an actuator device associated with a latching apparatus for retaining the cowl in the closed cowl position.
Figure 3:
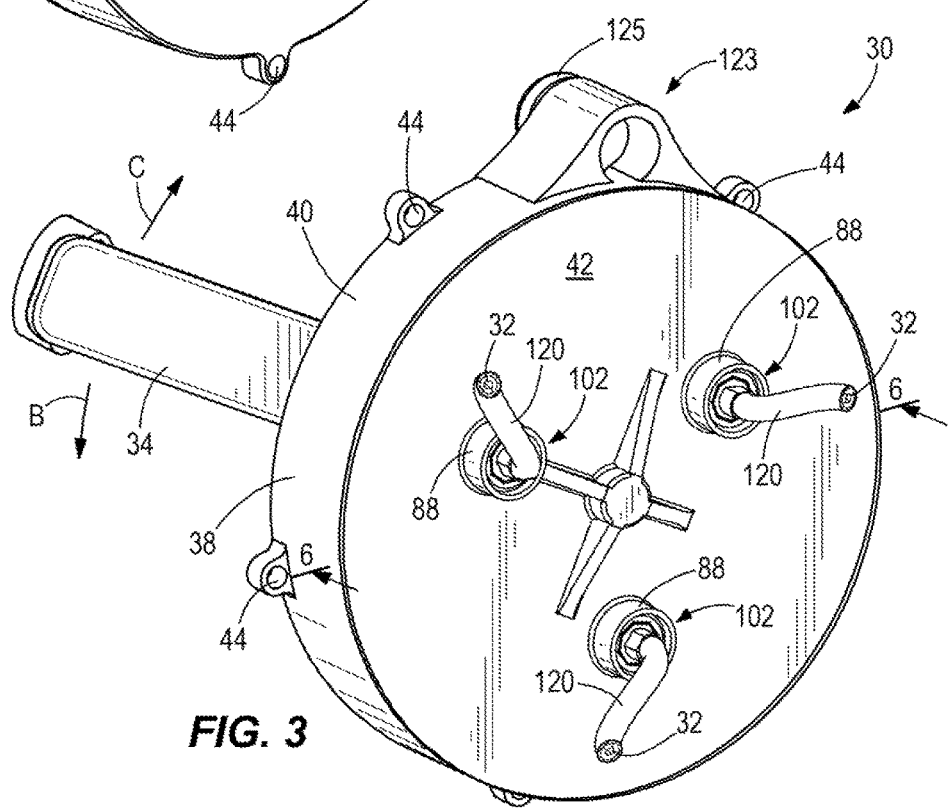
Figure 4:
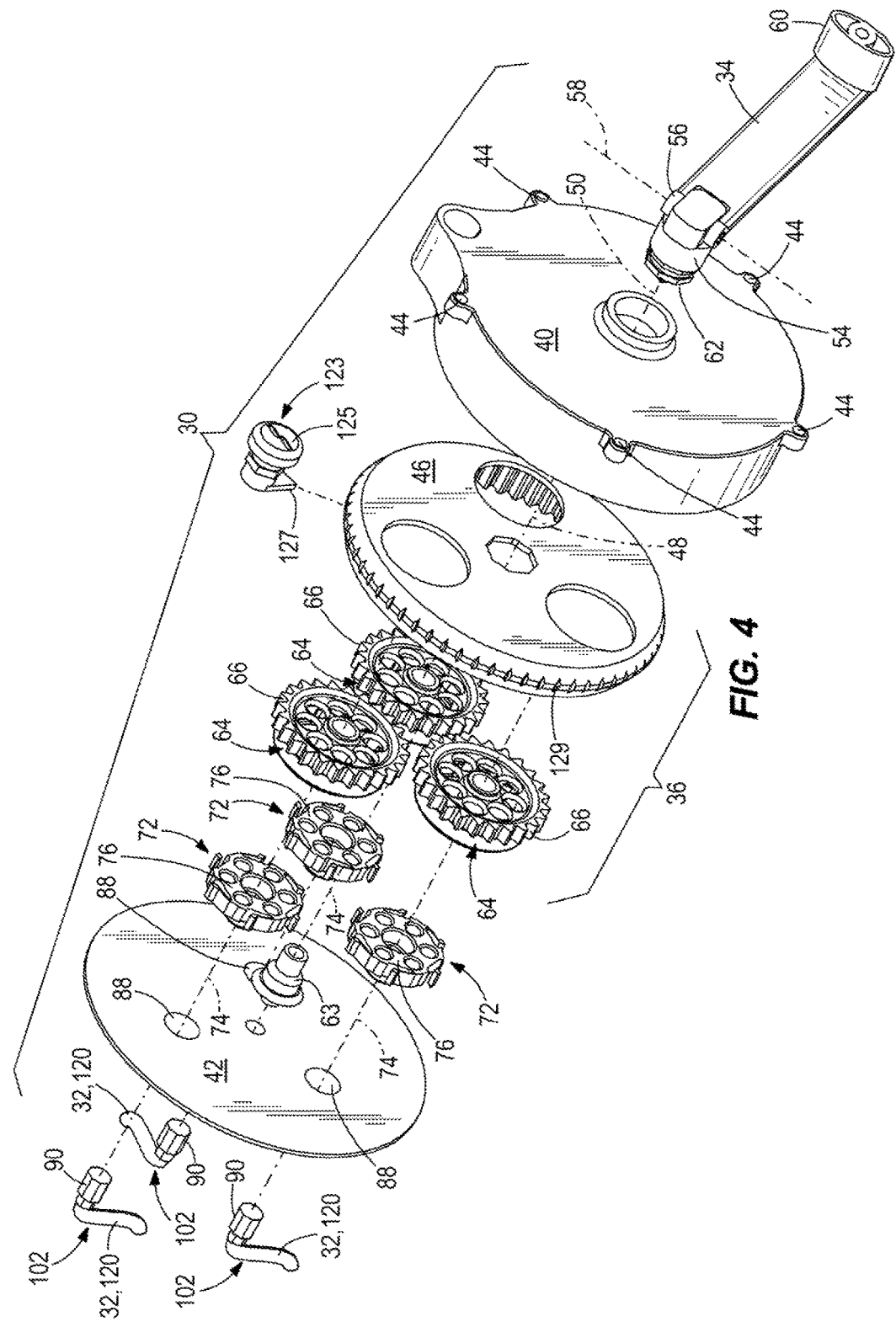
FIGS. 4 and 5 are exploded views of the actuator device shown in FIGS. 2 and 3, respectively.

Removal of the housing cover 42 from the base housing 40, providing access to the gearset 36. In the illustrated example, the gearset 36 includes a planetary gearset having a central ring gear 46 that rotates about a central ring gear axis 48 when the handle arm 34 is rotated about a handle arm axis 50. In the illustrated example, the ring gear axis 48 and handle arm axis 50 are parallel and coextend through a center of the gearset housing 38 and ring gear 46. The actuator device 30 includes a handle shaft 54 that extends along the handle arm axis 50 and is connected to the handle arm 34 via a clevis connection 56, such that the handle arm 34 is pivotable with respect to the handle shaft 54 about a handle pivot axis 58 that perpendicularly extends with respect to the handle arm axis 50. A rotatable handle knob 60 is disposed on the handle arm 34 at a location that is distal from the clevis connection 56. The rotatable handle knob 60 is rotatable with respect to the handle arm 34. The handle arm 34 is pivotable about the handle arm axis 50 between a use position (FIGS. 2, 3) and a stored position (FIG. 1) wherein the handle arm 34 is oriented flush against the outer surface of the top cowl 26. In the use position, an operator can grasp the rotatable handle knob 60 and rotate the handle arm 34 about the handle arm axis 50 in first and second directions, B, C, which in turn causes corresponding rotation of the ring gear 46 about the ring gear axis 48, as shown in FIGS. 2, 3 and 6, and further described herein below.

The handle shaft 54 is connected to the ring gear 46 by an end nut 62 and bolt 63 such that the handle arm 34 and ring gear 46 rotate together about the ring gear axis 48 and handle arm axis 50, respectively. A plurality of planet gears 64 is disposed in the inner radius of the ring gear 46. Each planet gear 64 has radially outwardly facing gear teeth 66 that are engaged with radially inwardly facing gear teeth 68 on the ring gear 46. Each planet gear 64 has a central hub 70 that is connected to the gearset housing 38 via the housing cover 42 and via a one-way clutch 72, as will be further described herein below. Rotation of the handle arm 34 causes rotation of the handle shaft 54, which in turn causes rotation of the ring gear 46, as shown at arrows B and C. Rotation of the ring gear 46 in the directions B, C causes corresponding rotation of each respective planet gears 64 about its own planet gear axis 74. As shown in the drawing, the ring gear axis 48 is parallel to and spaced apart from the respective planet gear axis 74. The drawings show three planet gears 64 connected to three wires 32, however this number and arrangement can vary depending upon the number of retainers 28 and wires 32, which also can vary.

A one-way clutch 72 is provided for each of the planet gears 64. The configuration of the one-way clutch 72 can vary from that which is shown. In the illustrated example, each one-way clutch 72 is nested in a respective planet gear 64. As shown in FIG. 7, each one-way clutch 72 includes a clutch body 76 having an outer circumference with a plurality of deflection tabs 78. Each deflection tab 78 has a cantilever arm 80 connected to the clutch body 76 and an engagement head 82 disposed on the end of the cantilever arm 80. Each respective planet gear 64 has corresponding ridges 84 that are oriented radially inwardly towards the outer circumference of the clutch body 76. The clutch body 76 has a central hub 86 (FIG. 5) that receives the central hub 70 on one side of the clutch body 76. The central hub 86 extends into a hub-receiving bore 88 on the interior of housing cover 42. Nesting engagement between the central hub 70, central hub 86 and hub-receiving bore 88 prevents rotation of the one-way clutches 72 and planet gears 64 about the ring gear axis 48. The nesting engagement allows rotation of the planet gears 64 and one-way clutches 72 about their respective planet gear axis 74. The nesting engagement further allows relative rotation between the one-way clutch 72 and planet gear 64 about their respective planet gear axis 74. Each central hub 86 on the respective clutch bodies 76 is connected to one of the wires 32 such that rotation of the one-way clutch 72 causes corresponding rotation of the respective wire 32. The type of connection can vary from that which is shown. In this example, each wire has a hex nut 90 that is received in a corresponding hex recess 92 in a corresponding central hub 86 such that the hex nut 90 is not rotatable with respect to the corresponding control hub 86.

The one-way clutch 72, via the deflection tabs 78, allows relative rotation in certain instances between the respective planet gear 64 and one-way clutch 72 and in other instances prevents relative rotation between the respective planet gear 64 and one-way clutch 72. As explained above, rotation of the handle arm 34 in the first direction B causes corresponding rotation of the ring gear 46 in the first direction B and corresponding rotation of the planet gears 64 in the first direction B, which causes corresponding rotation of the respective one-way clutches 72, via engagement between the heads 82 on the cantilever arms 80 of the deflection tabs 78 and the cam surfaces 94 on one side of the ridges 84. Such rotation of the one-way clutches 72 causes corresponding rotation of the wires 32. Rotation of the handle arm 34 causes such rotation of the wires 32 until the wires 32 resist such rotation for reasons that will be explained herein below with respect to FIGS. 8-12. Upon such resistance, the deflection tabs 78 deflect due to engagement between the head 82 and camming surface 94 and the resiliency of the cantilever arm 80. The amount of resistance required to cause deflection of the deflection tabs 78 is determined by the shape of the camming surface 94 and head 82, as well as the resiliency of the cantilever arms 80. Upon sufficient deflection of the deflection tabs 78, the head 82 passes by the respective ridge 84, thus permitting the planet gears 64 to rotate relative to the one-way clutch 72. Such relative rotation prevents further rotation of the one-way clutch 72 and wire 32 due to rotation of the handle arm 34.

As described herein above, opposite rotation of the actuator device 30 about the handle arm axis 50 in the second direction C causes corresponding rotation of the ring gear 46 about the ring gear axis 48 in the second direction C, which results in corresponding rotation of the planet gears 64 in the second direction C. One-way clutch 72 is caused to rotate along with the planet gears 64 due to engagement between the heads 82 on the deflection tabs 78 and the stop surfaces 96 on the ridges 84, located opposite to the camming surfaces 94. Rotation of the one-way clutch 72 in the second direction C causes corresponding rotation of the respective wires 32.

Referring now to FIGS. 1 and 8-12, each wire 32 has a first end 100 that couples to and alternately uncouples from the retainer 28 and a second end 102 that remains coupled to the actuator device 30 via the one-way clutch 72, as described herein above. Actuation of the actuator device 30 (in this case actuation is caused via rotation of the handle arm 34 about the handle arm axis 50) causes corresponding rotation of the respective wire 32 via connection between the second end 102 and the one-way clutch 72. As shown by comparison of FIGS. 10-12, actuation of the actuator device 30 causes the first end 100 of the wire 32 to rotate and become coupled to the retainer 28 via a threaded connection. More specifically, rotation of the handle arm 34 in the first direction B causes the wire 32 to rotate in the first direction B such that the first end 100 axially translates (via the threaded connection) into engagement with the retainer 28 (compare FIGS. 10-12). Rotation of the actuator device 30 in the opposite, second direction C causes the wire 32 to rotate in the second direction C such that the first end 100 axially translates (via the threaded connection) out of engagement with the retainer 28 (compare FIGS. 12-10).

Figure 8:
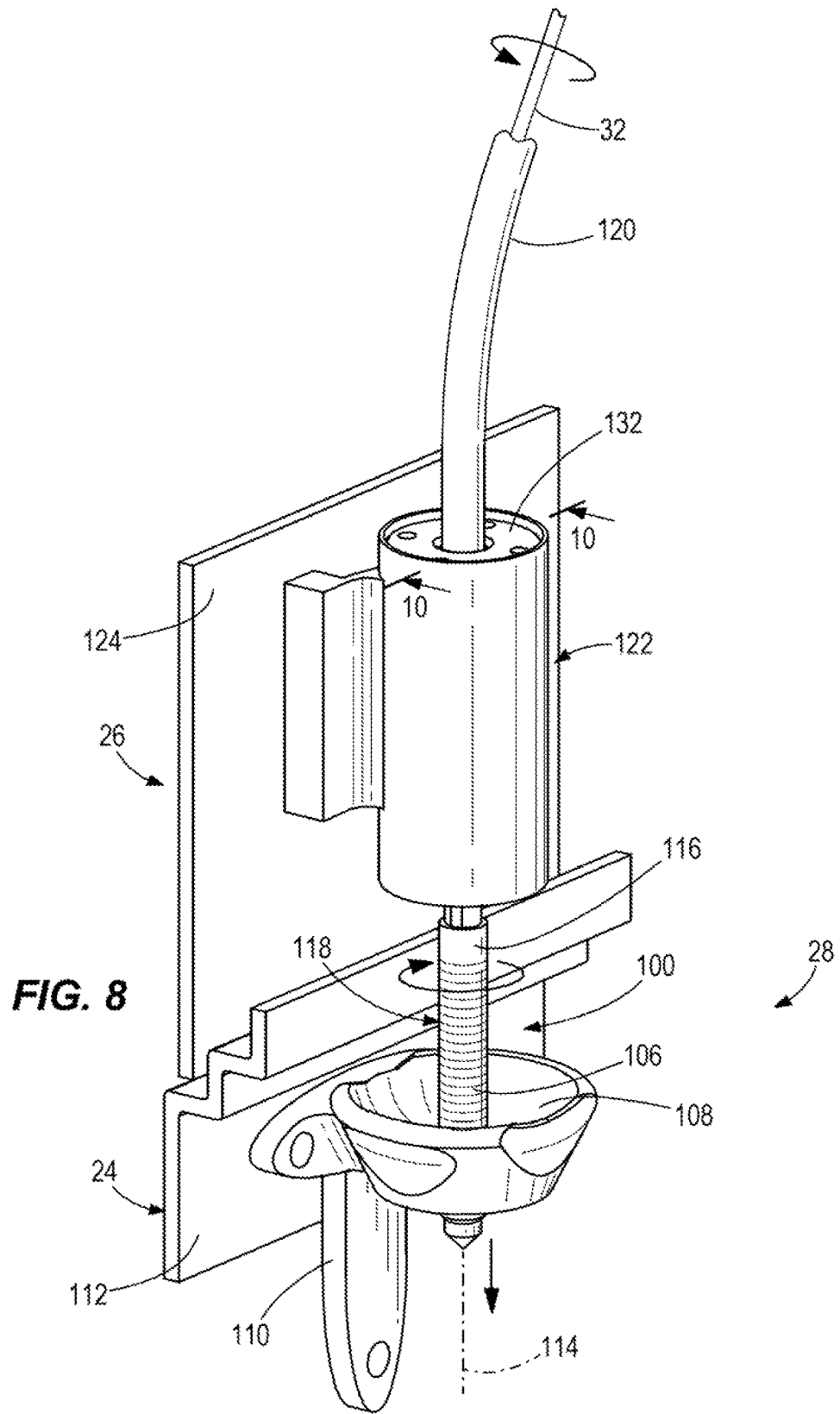
FIG. 8 is a perspective view of a wire, wire housing, and retainer associated with the latching apparatus.
Figure 9:
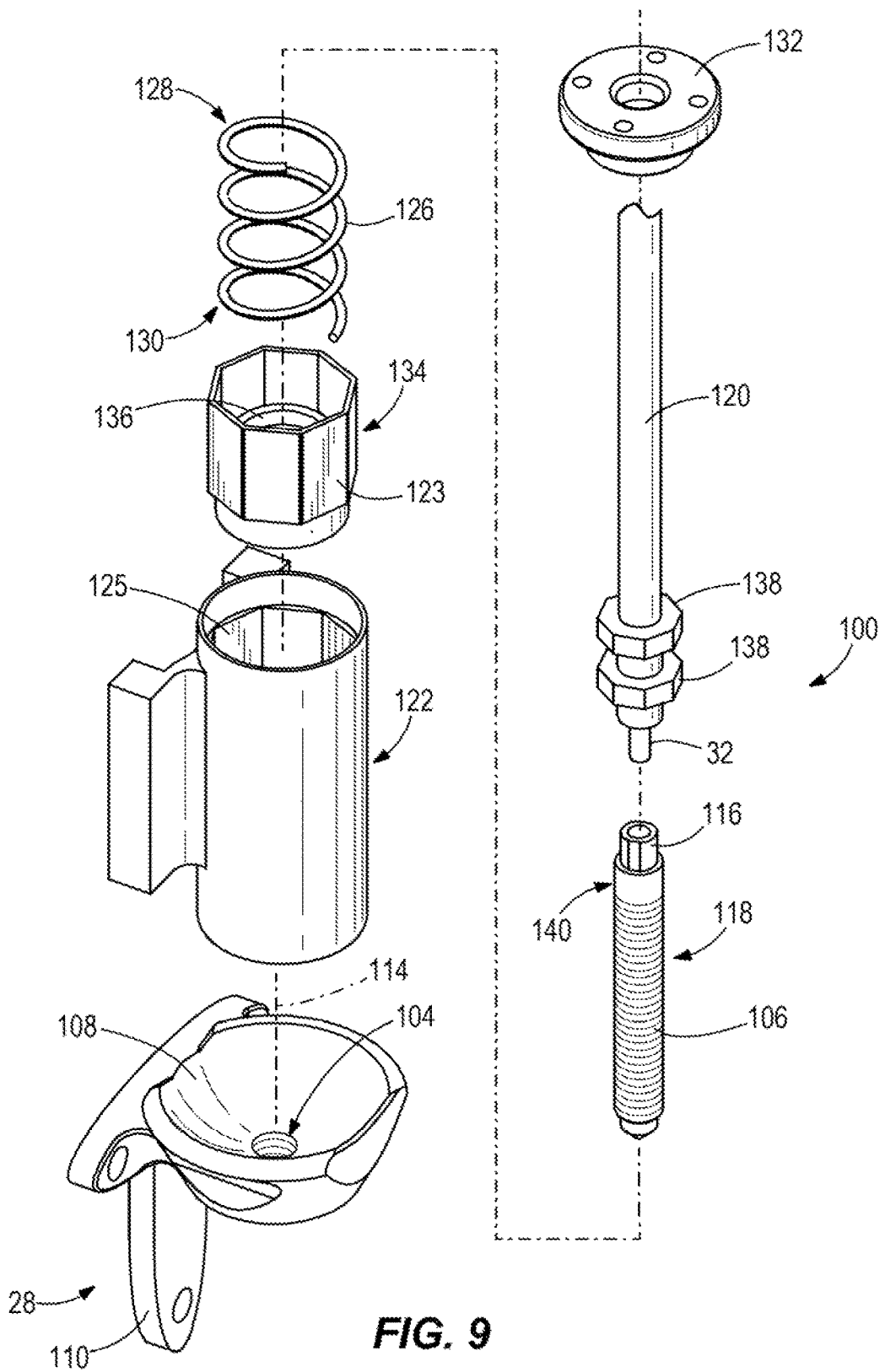
FIG. 9 is an exploded view of FIG. 8.

As shown in FIG. 9, the threaded connection is facilitated by a threaded bore 104 on the retainer 28 and threads 106 on the first end 100 of the wire 32. The retainer 28 includes a funnel 108 that guides the first end 100 of the wire 32 into engagement with the threaded bore 104, as will be described further herein below. The retainer 28 includes a mounting plate 110 that is configured to mount to an inner cowl surface 112 on the bottom cowl 24. As shown in FIG. 8, the funnel 108 extends along a funnel axis 114 and also extends transversely to the mounting plate 110.

A pin 116 is fixed to the first end 100 of the wire 32. The pin 116 has a threaded outer surface 118 that contains threads 106, which as discussed above, engage with the threaded bore 104 of the retainer 28. The majority of the wire 32 is enclosed in a wire sheath 120. The wire 32 and pin 116 are rotatable together about their own axes with respect to the stationary wire sheath 120.

A wire housing 122 is fixed to an inner surface 124 of the top cowl 26 at a location that is adjacent to the mounting plate 110 when the cowl 22 is in the closed position shown in FIG. 1. The first end 100 of the wire 32 extends through and is retained by the wire housing 122, and is axially movable with respect to the wire housing 122, as shown by comparison of FIGS. 10-12. The configuration of the wire housing 122 can vary from that which is shown. In the illustrated example, the wire housing 122 has a cylindrical shape, however the shape can vary from that shown. A coil spring 126 is disposed in the wire housing 122. The coil spring 126 has a first end 128 that acts on (i.e. pushes against) the wire housing 122 when the coil spring 126 is compressed and an opposite, second end 130 that acts on (i.e. pushes against) the wire 32 when the coil spring 126 is compressed.

The coil spring 126 normally biases the first end 100 of the wire 32 out of the wire housing 122, towards the retainer 28 (as the top cowl 26 is moved into the closed cowl positon shown in FIG. 1). An end cap 132 is disposed on the wire housing 122, opposite from the retainer 28 when the top cowl 26 is in the closed cowl position. The first end 128 of the coil spring 126 acts on the wire housing 122 via the end cap 132. A pin cap 134 is coupled to the wire 32 and disposed in the wire housing 122. The pin cap 134 is prevented from rotating with respect to the wire housing 122 via engagement surfaces 123, 125. The pin cap 134 has an inner ledge 136 and the second end 130 of the coil spring 126 acts on (i.e. pushes against) the inner ledge 136 to thereby act on the wire 32. In the illustrated example, the pin cap 134 is fixed to the wire sheath 120 by opposite nuts 138. As such, the pin 116 on the first end 100 of the wire 32 is biased out of the wire housing 122 such that when the top cowl 26 is moved into the closed cowl positon, the pin 116, including the threaded outer surface 118, is funneled by the funnel 108 into initial engagement with the threaded bore 104 located along the funnel axis 114. If the top cowl 26 is placed out of alignment with the bottom cowl 24, such that the pin 116 engages with the bottom cowl 24 or another surface, such as for example the ground, the coil spring 126 will compress, allowing the pin cap 134, pin 116, and wire 32 to retract into the wire housing 122. This advantageously prevents wear and accidental breakage of the pin 116 and thus increases the durability of the latching apparatus 20.

Figure 10:
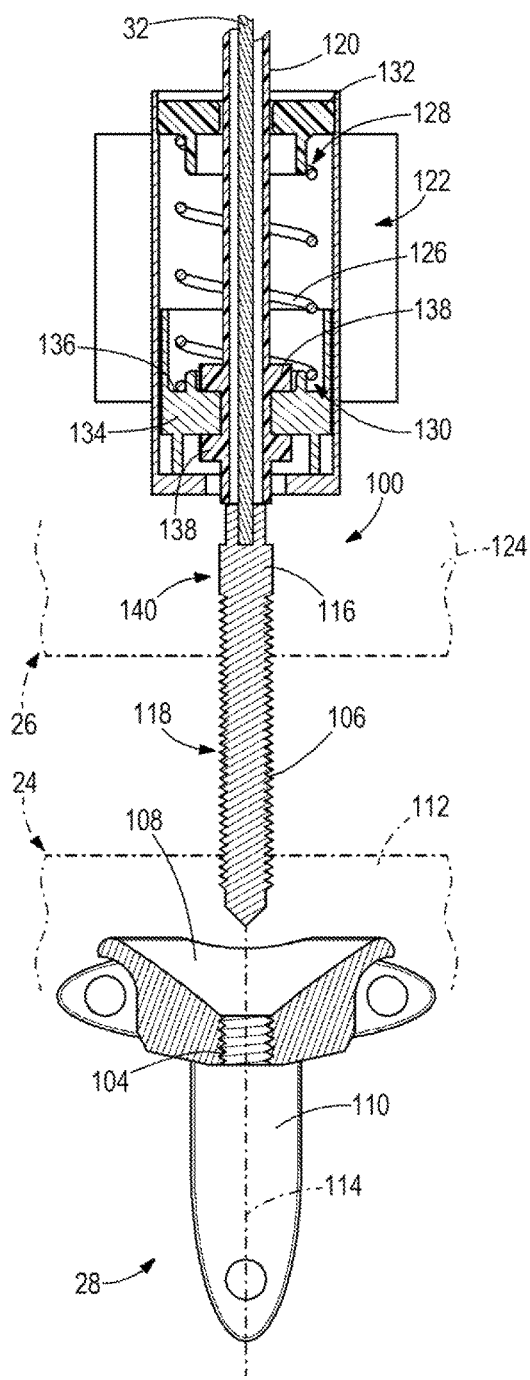
FIGS. 10-12 are sectional views showing movement of the latching apparatus from an unlatched position to a latched position.
Figure 11:
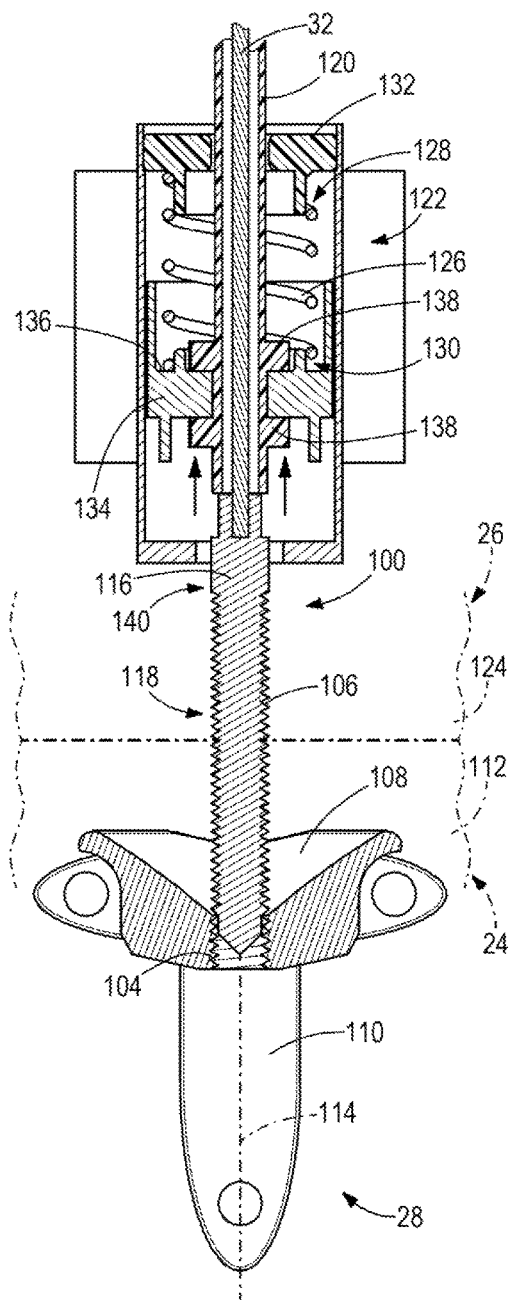
Figure 12:
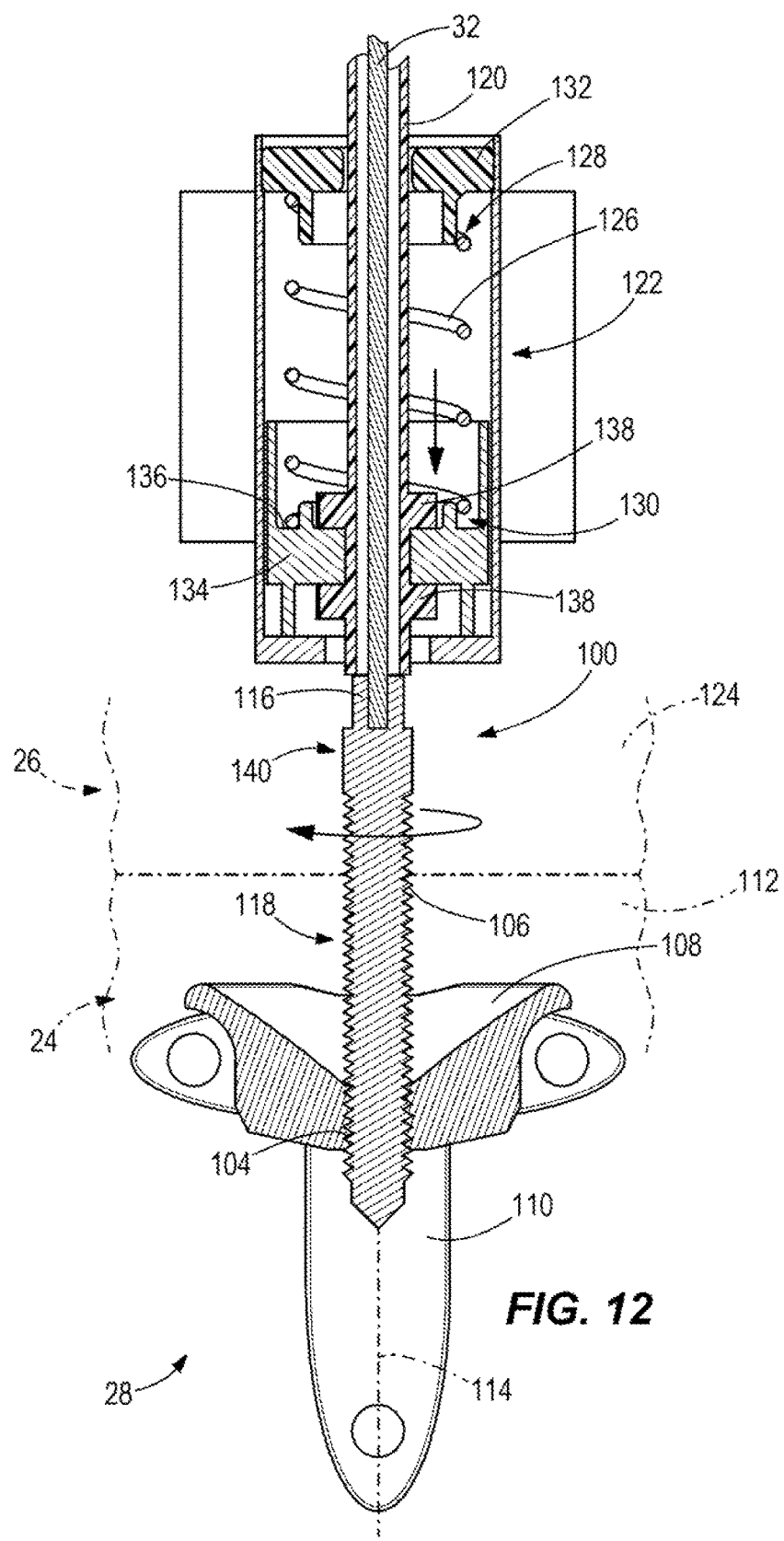

FIG. 10 depicts the latching apparatus 20 as the top cowl 26 is moved towards the bottom cowl 24, into the closed cowl position. By comparing FIG. 10 and FIG. 11, it can be seen that the movement of the top cowl 26 towards the bottom cowl 24 causes the funnel 108 to funnel the pin 116 towards the funnel axis 114, such that the threads 106 engage with the threaded bore 104. As shown at FIG. 12, subsequent rotation of the actuator device 30 in the first direction B causes rotation of the wire 32, as described herein above, which in turn causes the threaded connection to engage and move the pin 116 axially into the threaded bore 104, thus latching the bottom cowl 24 and top cowl 26 together in the closed cowl positon. Opposite rotation of the actuator device 30 in the second direction C causes opposite rotation of the wire 32, which causes the threaded connection to unthread. The pin 116 is axially moved out of engagement with the threaded bore 104, thus unlatching the latching apparatus 20 and allowing movement of the top cowl 26 into the noted open cowl position.

Rotation of the actuator device 30 in the first direction B causes the threaded connection to engage and move the pin 116 axially into threaded bore 104 until the end 140 of the threaded outer surface 118 reaches the threaded bore 104 of the retainer 28. Once the end 140 reaches the threaded bore 104, further rotation of the pin 116 and wire 32 is resisted. This resistance is transferred to the one-way clutches 72 via the connection between the second end 102 of the wire 32 and the one-way clutch 72. Once there is sufficient resistance transferred via the wire 32, the deflection tabs 78 deflect and allow relative rotation between the respective planet gear 64 and one-way clutch 72, as described herein above, such that continued rotation of the handle arm 34 is not transferred to the wires 32 and pin 116. Relative rotation between planet gear 64 and one-way clutch 72 causes an audible clicking sound as the head 82 rides over the ridges 84, thus indicating to the operator that the wire 32 is fully engaged with the retainer 28. The operator is free to continue rotation of the handle arm 34 to ensure that all of the respective wires 32 in the plurality of wires 32 are engaged with the respective retainers 28, without damaging a particular wire 32 and retainer combination 28 that may already be in full engagement. Opposite rotation of the handle arm 34 simultaneously causes opposite rotation of all the respective pins 116, thus initiating unlatching of each wire 32 and retainer 28 combination in the latching device 20.

Figure 5:
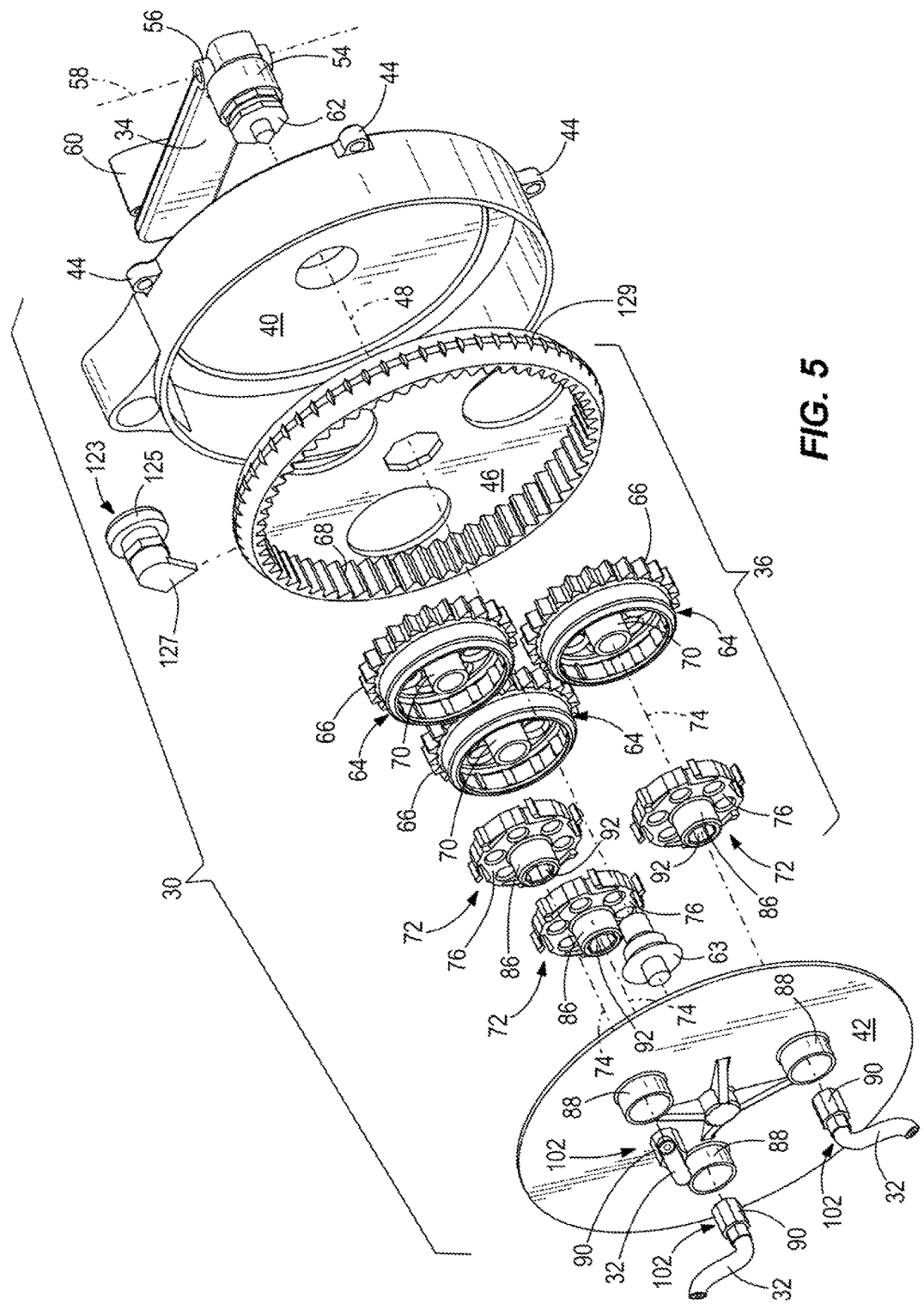

As shown in FIG. 5, the handle device 30 can include a lock 123 that prevents rotation of the gear set 36. In this example, the lock 123 includes a handle 125 that is manually rotatable to cause a locking finger 127 to engage with one of a plurality of indentations 129 disposed around the outer circumference of the ring gear 46. Engagement of the locking finger 127 with one of the indentations 129 prevents rotation of the ring gear, thus preventing rotation of the wires 32.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

What is claimed is:

1. A latching apparatus and cowl for an outboard marine engine, the cowl having a first cowl portion and a second cowl portion which are latched together by the latching apparatus in a closed cowl position and unlatched from each other in an open cowl position, the latching apparatus comprising:

a retainer on the first cowl portion;

an actuator device on the second cowl portion; and a wire that is coupled to the retainer in the closed cowl position and uncoupled from the retainer in the open cowl position;

wherein the wire is coupled to the actuator device such that actuation of the actuator device causes rotation of the wire; and wherein in the closed cowl position an end of the wire is coupled to the retainer via a threaded connection, wherein actuation of the actuator device in a first direction rotates the wire and causes the end of the wire to axially translate into engagement with the retainer, and wherein actuation of the actuator device in a second direction rotates the wire and causes the end of the wire to axially translate out of engagement with the retainer.

2. The latching apparatus and cowl according to claim 1, wherein the retainer comprises a threaded bore that engages with the end of the wire in the closed cowl position.

3. The latching apparatus and cowl according to claim 2, wherein the retainer further comprises a funnel that guides the end of the wire into engagement with the threaded bore when the actuator device is actuated in the first direction.

4. The latching apparatus and cowl according to claim 3, wherein the retainer comprises a mounting plate that is configured to mount to an inner cowl surface of the first cowl portion, wherein the funnel transversely extends from the mounting plate.

5. The latching apparatus and cowl according to claim 2, wherein the end of the wire comprises a pin having a threaded outer surface that engages with the threaded bore on the retainer in the closed cowl position.

6. The latching apparatus and cowl according to claim 1, further comprising a stationary sheath on the wire, wherein the wire is rotatable within the sheath.

7. The latching apparatus according to claim 1, further comprising a wire housing on the second cowl portion, wherein the wire extends through the wire housing.

8. The latching apparatus and cowl according to claim 7, further comprising a spring having a first end that acts on the wire housing and an opposite second end that acts on the wire to bias the end of the wire out of the wire housing towards the retainer.

9. The latching apparatus and cowl according to claim 8, further comprising an end cap on the wire housing, wherein the first end of the spring acts on the wire housing via the end cap and further comprising a pin cap coupled to the wire, wherein the second end of the spring acts on the wire via the pin cap.

10. The latching apparatus and cowl according to claim 1, wherein the wire is one of a plurality of wires, wherein the retainer is one of a plurality of retainers on the first cowl portion, and wherein the actuator device further comprises a gearset that transmits actuation of the actuator device to the plurality of wires.

11. The latching apparatus and cowl according to claim 10, wherein the gearset comprises a planetary gearset.

12. The latching apparatus and cowl according to claim 11, wherein the planetary gearset comprises a ring gear that rotates about a ring gear axis when the actuator device is rotated, and a plurality of planet gears that each rotate about one of a plurality of planet gear axes when the ring gear is rotated about the ring gear axis, wherein the ring gear axis is parallel to the plurality of planet gear axes.

13. The latching apparatus and cowl according to claim 12, further comprising a lock that prevents rotation of the planetary gearset.

14. The latching apparatus and cowl according to claim 13, wherein the lock comprises an actuator device and a locking finger, wherein actuation of the actuator device of the lock engages the locking finger with the ring gear to prevent rotation of the ring gear.

15. The latching apparatus and cowl according to claim 1, wherein rotation of each of the plurality of planet gears causes rotation of a respective one of the plurality of wires.

16. The latching apparatus and cowl according to claim 15, further comprising a one-way clutch on each of the plurality of planet gears.

17. The latching apparatus and cowl according to claim 16, wherein the one-way clutch is nested in a respective planet gear in the plurality of planet gears.

18. The latching apparatus and cowl according to claim 17, wherein the one-way clutch comprises an outer circumference having at least one tab, wherein the respective planet gear comprises an inner circumferential surface having at least one a ridge, and wherein under resistance from the wire, the tab is configured to rotate past the ridge when the actuator device is rotated in the first direction so that relative rotation occurs between the respective planet gear and the one-way clutch, and wherein the tab is configured to engage with the ridge so as to prevents relative rotation between the respective planet gear and the one-way clutch when the actuator device is rotated in the second direction.

* * * * *